US005551965A

United States Patent [19]
Takahashi

[11] Patent Number: 5,551,965
[45] Date of Patent: Sep. 3, 1996

[54] APPARATUS FOR SEPARATING AND REMOVING A DANGEROUS SUBSTANCE FROM AN EXHAUST GAS

[75] Inventor: Ichirou Takahashi, Kamakura, Japan

[73] Assignee: Japan Process Engineering Ltd., Osaka, Japan

[21] Appl. No.: 271,735

[22] Filed: Jul. 7, 1994

[30]   Foreign Application Priority Data

Jul. 8, 1993  [JP]  Japan .................................. 5-221989

[51] Int. Cl.$^6$ ............................................ B01D 47/02
[52] U.S. Cl. ............................ 55/228; 55/229; 55/244; 95/196; 95/226; 118/603
[58] Field of Search ........................ 55/244, 256, 228, 55/229, 466, 471; 95/226, 196; 118/603, 610, 722, 724; 427/345, 248.1

[56]           References Cited

U.S. PATENT DOCUMENTS

| | | | |
|---|---|---|---|
| 3,963,464 | 6/1976 | Schinner | 55/228 |
| 4,054,429 | 10/1977 | Ostojic et al. | 55/228 X |
| 4,371,563 | 2/1983 | Muehlberger | 427/345 X |
| 4,990,166 | 2/1991 | Babich | 55/256 X |
| 5,143,527 | 9/1992 | Tian-Song | 55/256 X |
| 5,288,329 | 2/1994 | Nakamura et al. | 118/722 X |

Primary Examiner—Richard L. Chiesa
Attorney, Agent, or Firm—Sixbey Friedman Leedom & Ferguson; Gerald J. Ferguson, Jr.; Thomas W. Cole

[57]         ABSTRACT

In order to separate and remove a dangerous substance such as yellow phosphorus from exhaust gas generated in a semiconductor fabricating process by chemical vapor deposition, the exhaust gas is bathed in operating oil of a cooled oil tank of an oil-sealed rotary vacuum pump so that molecules of the yellow phosphorus or the like are caught by the cooled operating oil so as to be enveloped in the operating oil. Thus, a mixture operating oil of the substance and the operating oil is generated in the form of colloid. The mixture operating oil is passed through an oil filter of a filtration device so that the substance such as yellow phosphorus is precipitated by the filter and then the substance is removed. Meanwhile, the operating oil as a filtrate from which the substance has been filtered is cooled by an oil-temperature controller, and then returned to the oil-sealed rotary vacuum pump. Thus, the exhaust gas suctioned into the oil tank of the vacuum pump is ordinarily made contact with the cooled operating oil thereby enhancing the efficiency of separating the substance such as yellow phosphorus.

7 Claims, 4 Drawing Sheets

APPARATUS FOR SEPARATING AND REMOVING A DANGEROUS SUBSTANCE FROM AN EXHAUST GAS

BACKGROUND OF THE INVENTION

This invention relates to a method and apparatus of separating and removing a dangerous substance such as white phosphorus included in exhaust gas generated in a semiconductor fabricating process by chemical vapor deposition or the like.

In general, a substance such as white phosphorus is included in exhaust gas generated in a semiconductor fabricating process by chemical vapor deposition. When the white phosphorus as a single substance is exposed to the air, it is combustible even at an ordinary temperature. Therefore, the work of removing the white phosphorus is usually dangerous and has invited many accidents.

To remove a dangerous substance such as white phosphorus in exhaust gas, there has been known a conventional method in which a filter is disposed at a suitable position of an inlet pipe through which the exhaust gas flows and the dangerous substance such as white phosphorus is removed in such a manner as to be separated from the exhaust gas through the filter.

Generally, the inlet pipe is small in diameter and therefore the exhaust gas flows rapidly through the inlet pipe. Accordingly, it is difficult to enhance the efficiency of separating white phosphorus or the like by means of the filter attached to the inlet pipe as in the above method. Further, even if the filter is arranged at plural positions of the inlet pipe, this only invites degradation of cost efficiency, and complete separation and removal of white phosphorus or the like is difficult and non-reliable.

The present invention has been made in view of the foregoing problems. The present invention has its object of overcoming the defects of the prior technique, that is, when the substance such as white phosphorus included in exhaust gas in a semiconductor fabricating process by chemical vapor deposition is separated and removed, enhancing the efficiency of separating the substance from the gas by a simple mechanism and securing safety in separation and removal of the substance.

SUMMERY OF THE INVENTION

To attain the foregoing object, the present invention is composed by a combination of the following techniques:

(a) conducting exhaust gas generated in a semiconductor fabricating process or the like to an oil-sealed rotary vacuum pump using incombustible operating oil;

(b) cooling the incombustible operating oil in the oil-sealed rotary vacuum pump and bathing the exhaust gas into the cooled operating oil stored in an oil tank to separate a substance such as white phosphorus from the exhaust gas and mix the substance with the operating oil;

(c) conducting the operating oil mixed with the substance to a filtration device having a filter by operation of a circulating pump to filter and precipitate the substance such as white phosphorus through the filter so that the substance is removed individually;

(d) conducting the operating oil as a filtrate from which the substance has been removed to an oil-temperature control device having a temperature control element by operation of the circulating pump to cool the operating oil to a set temperature by the oil-temperature control device and then returning the operating oil to the oil-sealed rotary vacuum pump; and (e) by the returned operating oil, rapidly cooling the exhaust gas including vapor of high temperature conducted to the oil-sealed rotary vacuum pump so as to promote the action of separating the substance such as white phosphorus from the exhaust gas in the oil-sealed rotary vacuum pump.

The above steps (a) to (e) are repeated in its order.

Under the above construction of the present invention, the exhaust gas is first conducted to the oil-sealed rotary vacuum pump using the incombustible operating oil and forced into oil bathing in the oil tank having large area while rapidly cooled. During the oil bathing, the substance such as white phosphorus is separated from the exhaust gas by the operating oil which is slow in flow speed. At the time, since the operating oil is cooled, molecules of the substance such as white phosphorus are rapidly separated from the exhaust gas and caught by the operating oil so as to be enveloped therein thereby forming a colloid with the operating oil. As a result of this, the operating oil becomes a mixture operating oil including the substance. Further, the rest of the exhaust gas from which the substance has been separated is released outwardly from the oil-sealed rotary vacuum pump and retreated if necessary.

Then, by operation of the circulating pump, the mixture operating oil is conducted to the filtration device. The substance such as white phosphorus included in the mixture operating oil is filtered and precipitated through the filter so as to be removed in an appropriate manner. Accordingly, the substance such as white phosphorus can be separated and removed in safety.

The operating oil as a filtrate from which the substance has been removed is conducted to the oil-temperature control device having the temperature control element by operation of the circulating pump, cooled to a set temperature by the temperature control element and then returned to the oil-sealed rotary vacuum pump. By the cooled operating oil, the operating oil in the vacuum pump is rapidly cooled and regulated in temperature, so that the temperature at the oil bathing of the exhaust gas just after the exhaust gas is suctioned into the vacuum pump is regulated. As a result of the temperature regulation, the substance such as white phosphorus is separated from the exhaust gas and mixed with the operating oil with efficiency and the safety of the work using the filtration device is improved.

Accordingly, the present invention has many effects on industrial utilization, e.g., effects that the mechanism of the apparatus is simple, the mechanism of separating the substance such as white phosphorus can be connected in common to different kinds of apparatus in chemical vapor deposition and the like and the apparatus is convenient to operate and can be provided at low cost.

DESCRIPTION OF THE PREFERRED EMBODIMENTS

Description is made below about preferred embodiments of the present invention with reference to the drawings.

First Embodiment

Figure 1:
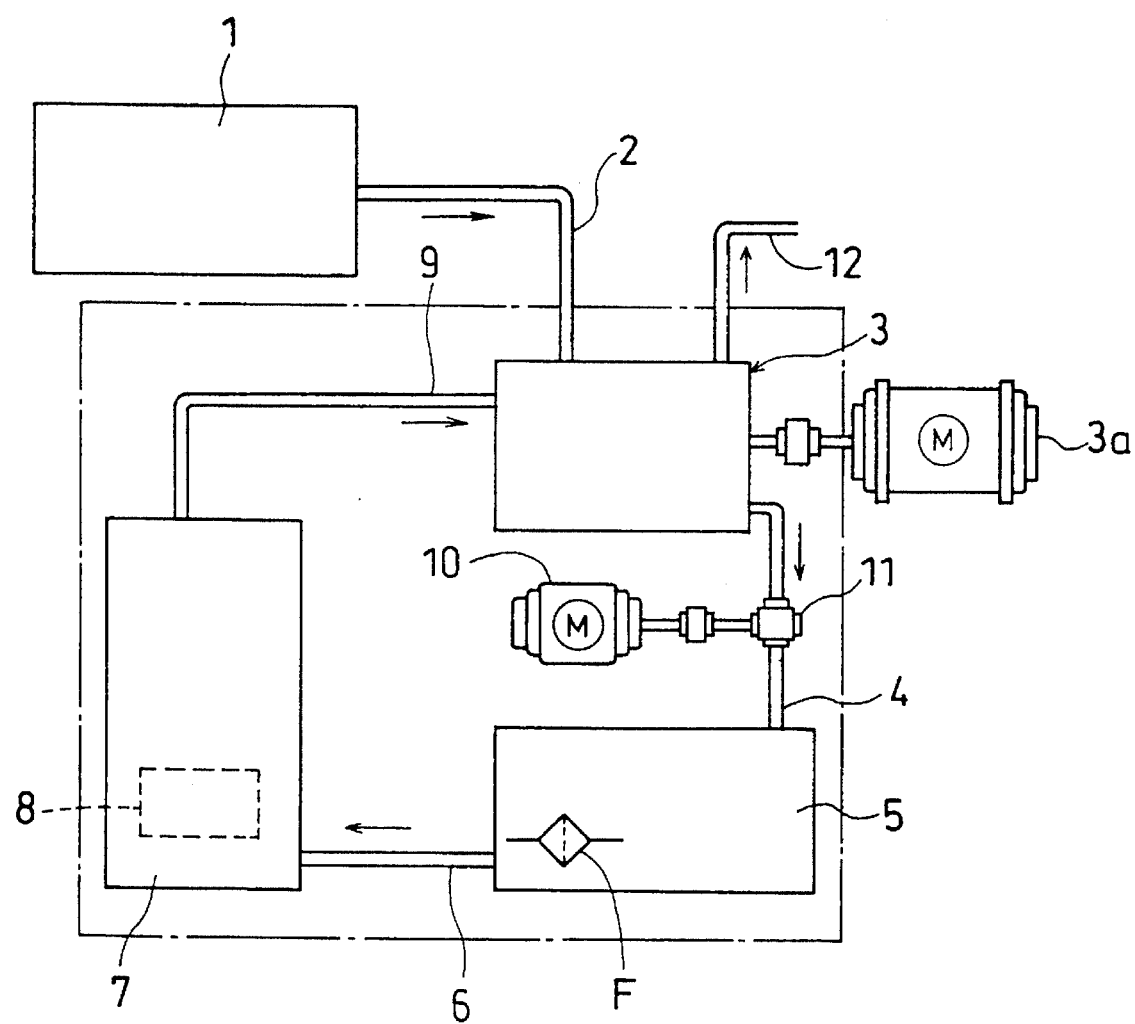
FIG. 1 is a diagram schematically showing an operating-oil circulation system of a first embodiment of a separation and removal apparatus according to the present invention.

FIG. 1 shows a first embodiment in which a separation and removal apparatus of the present invention is applied to a separation and removal apparatus for white phosphorus or the like. The separation and removal apparatus is composed so as to safely and effectively remove impurities generated from an unnecessary reactive gas such as phosphin $PH_3$ in a process room after chemical vapor deposition in a semiconductor fabricating process, e.g., impurities such as vaporous white phosphorus generated by thermal decomposition of phosphin.

Reference numeral 1 is a process room for fabricating semiconductors by chemical vapor deposition. The process room 1 is connected, through an inlet pipe 2, to an oil-sealed rotary vacuum pump 3 to be driven by a motor 3a. The vacuum pump 3 has an oil tank (not shown) for storing incombustible operating oil such as fluorinated oil which is composed of three kinds of atoms, i.e., carbon, fluoride and oxygen. By operation of the vacuum pump 3, gas exhausted from the process room 1 is suctioned into the vacuum pump 3 through the inlet pipe 2 and led into the oil tank of the vacuum pump 3. Thus, white phosphorus or the like contained in the exhaust gas is bathed into the operating oil. During the oil bathing, molecules of white phosphorus or the like are separated from the exhaust gas in such a manner as to be enveloped in the operating oil, thereby generating a mixture operating oil mixed with the molecules of white phosphorus or the like and formed into colloid.

The oil-sealed rotary vacuum pump 3 is connected to a filtration device 5 through a pipe 4. The filtration device 5 is connected to an oil-temperature control device 7 through a conductive pipe 6. The oil-temperature control device 7 is connected to the vacuum pump 3 through a return pipe 9. On the way of the pipe 4, there is provided a circulating pump 11 to be driven by a motor 10. The circulating pump 11 circulates the operating oil among the vacuum pump 3, the filtration device 5 and the oil-temperature control device 7.

The filtration device 5 has a cartridge-type oil filter F, which is exchangeable, receives the mixture operating oil generated in the vacuum pump 3 by operation of the circulating pump 11, and filters and precipitates white phosphorus or the like through the oil filter F. The oil filter F is exchanged when necessary. At this time, white phosphorus or the like filtered and precipitated is removed with the oil filter F.

The operating oil from which white phosphorus or the like has been precipitated by the filtration device 5, is conducted to the oil-temperature control device 7 through the conductive pipe 6 by operation of the circulating pump 11. The oil-temperature control device 7 has a temperature control element 8. The temperature control element 8 controls so that the operating oil conducted to the oil-temperature control device 7 cools down to a set temperature. The operating oil cooled through the oil-temperature control device 7 is returned to the oil-sealed rotary vacuum pump 3 through the return pipe 9, thereby mixing with operating oil in the vacuum pump 3.

Further, the oil-sealed rotary vacuum pump 3 is connected to an outlet pipe 12. The rest of the exhaust gas, from which white phosphorus has been separated into the mixture operating oil during the oil bathing in the vacuum pump 3, is emitted out of the vacuum pump 3 through the outlet pipe 12. The rest of the exhaust gas may be subjected to a re-treatment or a treatment on environmental hygiene if necessary.

Next, description is made about a method of separating and removing white phosphorus or the like by using the separation and removal apparatus having the above construction.

First, a flow of gas exhausted from the process room 1 in a semiconductor fabricating process by chemical vapor deposition, is conducted to the oil-sealed rotary vacuum pump 3. In the vacuum pump 3, white phosphorus or the like included in the exhaust gas is bathed into the operating oil in the oil tank of the vacuum pump 3. During the oil bathing, white phosphorus or the like is separated from the exhaust gas in such a manner that molecules of white phosphorus or the like are enveloped in the operating oil, thereby generating a mixture operating oil in the form of colloid. The rest of the exhaust gas, from which white phosphorus has been separated into the mixture operating oil by the oil bathing, is emitted out of the vacuum pump 3 through the outlet pipe 12.

Next, the mixture operating oil generated in the oil-sealed rotary vacuum pump 3 is conducted to the filtration device 5 through the pipe 4 by operation of the circulating pump 11. In the filtration device 5, white phosphorus or the like in the mixture operating oil is filtered and precipitated by the oil filter F of the filtration device 5. The white phosphorus or the like is removed with the oil filter F whenever the oil filter F is exchanged by a new one. As mentioned above, since the white phosphorus or the like in the exhaust gas is first mixed with the operating oil and then the white phosphorus or the like is removed so as to be precipitated from the mixture operating oil by the oil filter F, the white phosphorus or the like can be safely removed as compared with the conventional method.

Then, by operation of the circulating pump 11, the rest of the operating oil from which the white phosphorus or the like has been filtered and precipitated by the filtration device 5, is conducted to the oil-temperature control device 7 through the conductive pipe 6 and controlled to cool down to a set temperature by the temperature control element 8 of the oil-temperature control device 7. Thereafter, the rest of the operating oil cooled is returned to the oil-sealed rotary vacuum pump 3 through the return pipe 9 thereby mixing with operating oil in the vacuum pump 3.

The operating oil in the vacuum pump 3 is ordinarily heated by high-temperature exhaust gas introduced from the process room 1. In the above case, however, since the operating oil from the oil-temperature control device 7 is cooled, the operating oil in the vacuum pump 3 is cooled and regulated in temperature so as to be maintained at a set temperature where possible. Thus, since the exhaust gas is bathed into the operating oil cooled at any time in the vacuum pump 3, separation of white phosphorus or the like in the exhaust gas can be promoted at the oil bathing.

At the time, the temperature of the operating oil in the oil-sealed rotary vacuum pump 3 is preferably set to within the range of 10° to 15° C. in practice. In order to maintain the temperature of the operating oil in the vacuum pump 3 at within the range of 10° to 15° C., the operating oil returned from the oil-temperature control device 7 is preferably set to the range of 0° to 5° C., though it also depends on the flow rate of the operating oil.

In detail, practically, when the temperature of the operating oil in the vacuum pump 3 is below 10° C., the action of separating white phosphorus or the like from the exhaust gas bathed into the operating oil is deteriorated and in addition the filtration efficiency is lowered because of low viscosity of the operating oil. This prevents the fluidity of the operating oil, thereby resulting in hardness of the smooth circulation of the operating oil. On the contrary, when the temperature of the operating oil is over 15° C., the safety at the filtration and precipitation of white phosphorus or the like by the filtration device 5 is lowered. Accordingly, when the temperature of the operating oil in the vacuum pump 3 is set to within the range of 10° to 15° C., the action of separating white phosphorus or the like by bathing the exhaust gas into the operating oil can be promoted, and the safety at the filtration and precipitation of white phosphorus or the like by the filtration device 5 can be secured. Further, since the viscosity of the operating oil is further effective on the filtering action, the fluidity of the operating oil cannot be prevented and the smooth circulation of the operating oil can be achieved.

Second Embodiment

Figure 2:
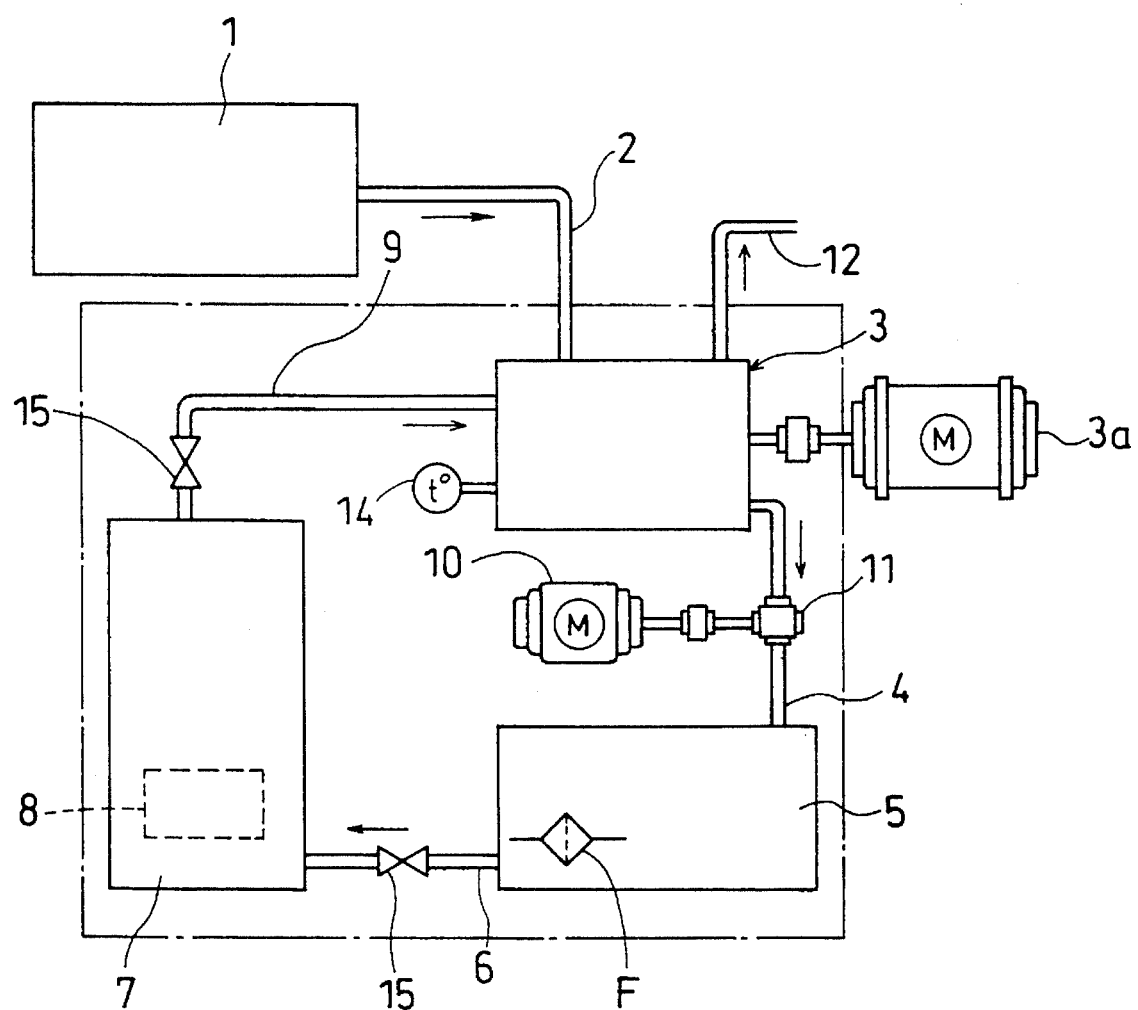
FIG. 2 is a diagram schematically showing an operating-oil circulation system of a second embodiment of the separation and removal apparatus according to the present invention.

FIG. 2 shows a second embodiment of the present invention. In this embodiment, in order to maintain the operating oil in the oil-sealed rotary vacuum pump 3 at a set temperature, a flow rate of the operating oil to be returned from the oil-temperature control device 7 to the vacuum pump 3 is hold at a set value.

In detail, there is provided at the oil-sealed rotary vacuum pump 3 an operating-oil temperature sensor 14 for sensing the temperature of the operating oil in the oil tank. Manual valves 15, 15 are provided in the conductive pipe 6 and the return pipe 9, respectively.

The temperature of the operating oil is sensed by the operating-oil temperature sensor 14. Then, the openings of the manual valves 15, 15 are controlled to regulate the flow rate of the operating oil to be returned to the vacuum pump 3 in order that the temperature of the operating oil is at the set temperature, i.e., within the range of 10° to 15° C. Thus, the temperature of the operating oil in the vacuum pump 3 can be maintained at the set temperature.

Third Embodiment

Figure 3:
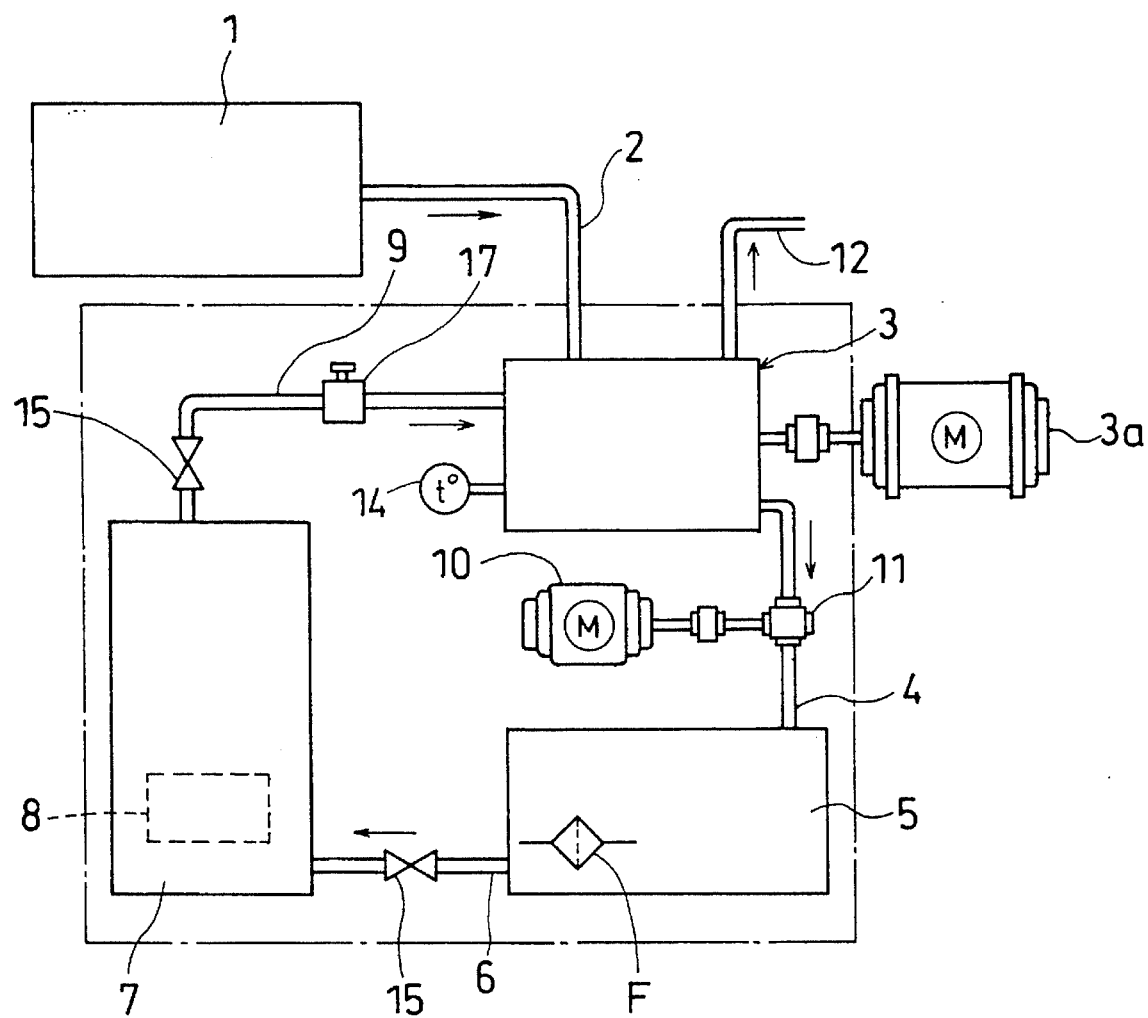
FIG. 3 is a diagram schematically showing an operating-oil circulation system of a third embodiment of the separation and removal apparatus according to the present invention.
Figure 4:
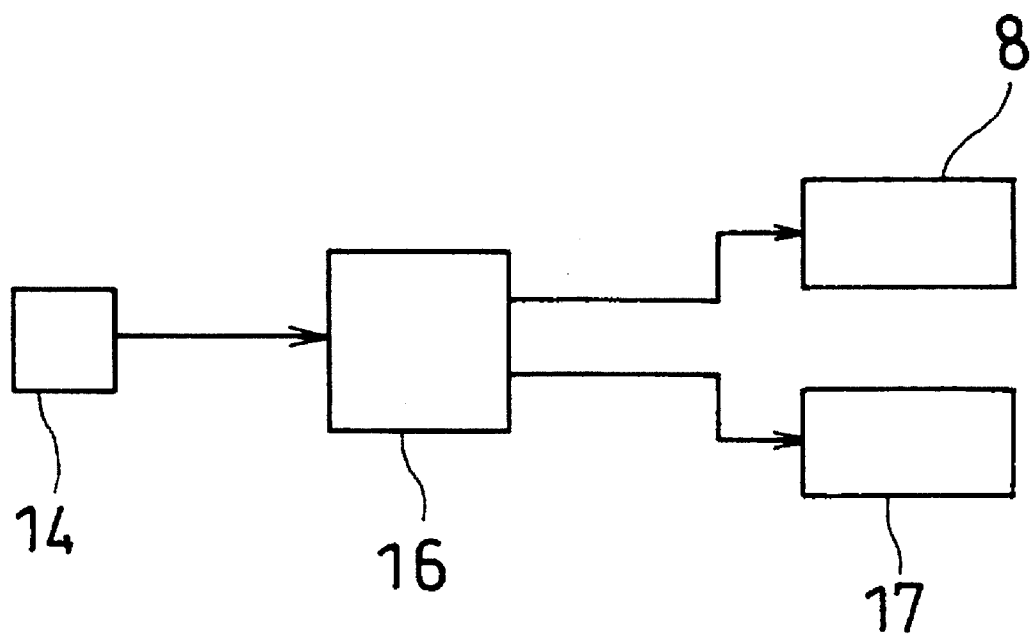
FIG. 4 is a block diagram showing a control system of the third embodiment.

FIGS. 3 and 4 show a third embodiment of the present invention. In this embodiment, the temperature of the operating oil in the oil-sealed rotary vacuum pump 3 is automatically maintained at the set temperature.

In detail, a flow-rate control mechanism 17 is disposed in the return pipe 9. The operating oil from the oil-temperature control device 7 is returned to the vacuum pump 3 through the return pipe 9 after the flow rate thereof is regulated by the flow-rate control mechanism 17, and then mixed with operating oil in the vacuum pump 3. In this case, respective manual valves 15 are fully opened. The flow-rate control mechanism 17 is not necessarily disposed in the return pipe 9 and may be disposed in the pipe 4 or the conductive pipe 6. Essentially, the flow-rate control mechanism 17 can be disposed at any place on a circulation path where the operating oil in the vacuum pump 3 is returned to the vacuum pump 3 via the filtration device 5 and the oil-temperature control device 7.

As shown in FIG. 4, the flow-rate control mechanism 17 receives an electric control signal from a controller 16, and based on the signal operates so as to control the flow rate of the operating oil. The temperature control element 8 of the oil-temperature control device 7 also operates by receiving an electric control signal from the controller 16. There is inputted to the controller 16 an output signal from the operating-oil temperature sensor 14 of the oil-sealed rotary vacuum pump 3. Based on the temperature of the operating oil in the vacuum pump 3, which has been sensed by the operating-oil temperature sensor 14 of the vacuum pump 3, the controller 16 outputs control signals to the temperature control element 8 of the oil-temperature control device 7 and the flow-rate control mechanism 17 respectively, thereby regulating the temperature of the oil-temperature control device 7 at the set temperature and operating the flow-rate control mechanism 17 to regulate the flow rate of the operating oil at a necessary rate along the program. Further, the controller 16 regulates both the temperature and flow rate of the operating oil in such a manner as to be associated with each other thereby automatically maintaining the operating oil in the vacuum pump 3 at the set temperature.

As mentioned above, according to the present embodiment, the temperature of the operating oil in the oil-sealed rotary vacuum pump 3 can be automatically controlled to maintain the set temperature.

A separation and removal apparatus of the present invention may be so composed that, in addition to the construction of the third embodiment, a viscosity sensor (not shown) for sensing a viscosity of the operating oil is disposed in the filtration device 5, an output signal of the viscosity sensor is inputted to the controller 16 and the flow-rate control mechanism 17 and the temperature control element 8 are controlled based on the viscosity of the operating oil. Thus, the operating oil returned to the oil-sealed rotary vacuum pump 3 can be regulated so as to have a viscosity suitable for filtration and then circulated, thereby improving filtration efficiency of the operating oil.

Further, in the controller 16, either the flow-rate control mechanism 17 or the temperature control element 8 of the oil-temperature control device 7 may be controlled singly so that the operating oil in the oil-sealed rotary vacuum pump 3 is maintained at the set temperature.

Furthermore, in the above embodiments, a dangerous substance is separated and removed from the exhaust gas generated in the semiconductor fabricating process. Besides the semiconductor fabricating process, a method of separating and removing a substance from exhaust gas and a separation and removal apparatus of the present invention can be applied to the case of separating and removing a dangerous substance from exhaust gas generated in processes other than the semiconductor fabricating process.

I claim:

1. A separation and removal apparatus for separating and removing a substance from exhaust gas, said separation and removal apparatus comprising:

an oil-sealed rotary vacuum pump for suctioning the exhaust gas to separate the substance from the exhaust gas and mix the substance with operating oil in the oil-sealed rotary vacuum pump thereby generating a mixture operating oil of the substance and the operating oil, and discharging the rest of the exhaust gas from which the substance has been separated;

a filtration device connected to the oil-sealed rotary vacuum pump and having a filter for filtering and precipitating the substance from the mixture operating oil generated in the oil-sealed rotary vacuum pump;

an oil-temperature control means connected to the filtration device and the oil-sealed rotary vacuum pump and having a temperature control element for changing to a set temperature the temperature of filtered operating oil from which the substance has been removed by the filtration device to maintain the viscosity of the operating oil to above a preselected level;

a circulating pump for circulating the operating oil so that the operating oil in the oil-sealed rotary vacuum pump returns to the oil-sealed rotary vacuum pump through the filtration device and the oil-temperature control means;

an operating-oil temperature sensor for sensing a temperature of the operating oil in the oil-sealed rotary vacuum pump; and a controller for controlling the temperature control element of the oil-temperature control means based on an output signal of the operating-oil temperature sensor so that the temperature of the operating oil which has been sensed by the operating-oil temperature sensor reaches to the set temperature.

2. The separation and removal apparatus according to claim 1, wherein the controller controls the flow-rate control mechanism and the temperature control element of the oil-temperature control means so that the temperature of the operating oil sensed by the oil-temperature sensor reaches to the set temperature.

3. The separation and removal apparatus according to claim 1, wherein the filter of the filtration device is exchangeable.

4. The separation and removal apparatus according to claim 1, wherein the exhaust gas is generated in a semiconductor fabricating process by chemical vapor deposition and the substance is white phosphorus included in the exhaust gas.

5. The separation and removal apparatus according to claim 4, wherein the operating oil is fluorinated oil.

6. The separation and removal apparatus according to claim 4, wherein the oil-sealed rotary vacuum pump conducts the exhaust gas to an oil tank for the operating oil and bathes the exhaust gas in the oil tank to separate the substance from the exhaust gas and mix the substance with the operating oil, thereby generating the mixture operating oil of the substance and the operating oil.

7. The separation and removal apparatus according to claim 6, wherein the temperature of the operating oil during bathing the exhaust gas in the operating oil of the oil tank is 10° to 15° C.

* * * * *